US007358974B2

(12) United States Patent
Blythe et al.

(10) Patent No.: US 7,358,974 B2
(45) Date of Patent: Apr. 15, 2008

(54) METHOD AND SYSTEM FOR MINIMIZING AN AMOUNT OF DATA NEEDED TO TEST DATA AGAINST SUBAREA BOUNDARIES IN SPATIALLY COMPOSITED DIGITAL VIDEO

(75) Inventors: David R. Blythe, San Carlos, CA (US); Marc Schafer, Naples (IT); Paul Jeffrey Ungar, Mountain View, CA (US); David Yu, San Francisco, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 721 days.

(21) Appl. No.: 10/058,050

(22) Filed: Jan. 29, 2002

(65) Prior Publication Data

US 2002/0145612 A1 Oct. 10, 2002

Related U.S. Application Data

(60) Provisional application No. 60/264,254, filed on Jan. 29, 2001.

(51) Int. Cl.
*G06F 15/80* (2006.01)
*G06T 15/30* (2006.01)
(52) U.S. Cl. .................. 345/505; 345/423; 345/418
(58) Field of Classification Search ............... 345/619, 345/505, 418, 423
See application file for complete search history.

(56) References Cited

U.S. PATENT DOCUMENTS 4,780,709 A 10/1988 Randall ................. 345/27

(Continued)

OTHER PUBLICATIONS

Akeley K. et al., "High-Performance Polygon Rendering," ACM Computer Graphics vol. 22, No. 4, pp. 239-246.*

(Continued)

*Primary Examiner*—Kee M. Tung
*Assistant Examiner*—Michelle K Lay
(74) *Attorney, Agent, or Firm*—Sterne, Kessler, Goldstein & Fox PLLC

(57) ABSTRACT

A method and system for minimizing an amount of data needed to test data against subarea boundaries in spatially composited digital video. Spatial compositing uses a graphics unit or pipeline to render a portion (subarea) of each overall frame of digital video images. This reduces the amount of data that each processor must act on and increases the rate at which an overall frame is rendered. Optimization of spatial compositing depends on balancing the processing load among the different pipelines. The processing load typically is direct function of the size of a given subarea and a function of the rendering complexity for objects within this subarea. Load balancing strives to measure these variables and adjust, from frame to frame, the number, sizes, and positions of the subareas. The cost of this approach is the necessity to communicate, in conjunction with each frame, the graphics data that will be rendered. Graphics data for a frame is composed of geometry chunks. Each geometry chunk is defined by its own bounding region, where the bounding region defines the space the geometry chunk occupies on the compositing window. Only the parameters that define the bounding region are communicated to each graphics unit in conjunction with the determination of which graphics unit will render the geometry chunk defined by the bounding region. The actual graphics data that comprises the geometry chunk is communicated only to those geometry units that will actually render the geometry chunk. This reduces the amount of data needed to communicate graphics data information in spatially composited digital video.

13 Claims, 12 Drawing Sheets

U.S. PATENT DOCUMENTS

| | | | | |
|---|---|---|---|---|
| 5,146,335 | A | 9/1992 | Kim et al. | 348/564 |
| 5,712,995 | A | 1/1998 | Cohn | 715/792 |
| 5,736,988 | A | 4/1998 | Shaw et al. | 345/423 |
| 5,808,617 | A * | 9/1998 | Kenworthy et al. | 345/421 |
| 5,815,168 | A | 9/1998 | May | 345/572 |
| 5,821,950 | A * | 10/1998 | Rentschler et al. | 345/505 |
| 5,867,166 | A | 2/1999 | Myhrvold et al. | 345/419 |
| 5,940,086 | A * | 8/1999 | Rentschler et al. | 345/503 |
| 5,969,726 | A * | 10/1999 | Rentschler et al. | 345/506 |
| 6,008,803 | A | 12/1999 | Rowe et al. | 715/721 |
| 6,104,842 | A * | 8/2000 | Rich | 382/304 |
| 6,191,800 | B1 | 2/2001 | Arenburg et al. | 345/505 |
| 6,223,183 | B1 | 4/2001 | Smith et al. | 707/102 |
| 6,229,544 | B1 | 5/2001 | Cragun | 345/418 |
| 6,259,826 | B1 | 7/2001 | Pollard et al. | 382/284 |
| 6,292,200 | B1 * | 9/2001 | Bowen et al. | 345/506 |
| 6,323,860 | B1 | 11/2001 | Zhu et al. | 345/427 |
| 6,326,964 | B1 * | 12/2001 | Snyder et al. | 345/419 |
| 6,344,852 | B1 * | 2/2002 | Zhu et al. | 345/418 |
| 6,396,323 | B1 | 5/2002 | Goodell | 327/308 |
| 6,466,223 | B1 | 10/2002 | Dorbie et al. | 345/582 |
| 6,470,287 | B1 | 10/2002 | Smartt | 702/102 |
| 6,483,515 | B1 | 11/2002 | Hanko | 345/545 |
| 6,515,673 | B1 | 2/2003 | Hashimoto et al. | 345/582 |
| 6,525,737 | B1 | 2/2003 | Duluk, Jr. et al. | 345/506 |
| 6,552,723 | B1 | 4/2003 | Duluk, Jr. et al. | 345/419 |
| 6,624,797 | B1 | 9/2003 | Wheeler et al. | 345/1.2 |
| 6,700,588 | B1 | 3/2004 | MacInnis et al. | 345/629 |
| 6,714,196 | B2 | 3/2004 | McCormack et al. | 345/423 |
| 6,724,403 | B1 | 4/2004 | Santoro et al. | 715/765 |
| 6,724,946 | B1 | 4/2004 | Kusama et al. | 382/284 |
| 6,734,873 | B1 | 5/2004 | Herf et al. | 345/629 |

OTHER PUBLICATIONS

U.S. Appl. No. 09/689,784, filed Oct. 13, 2000, Sadowski et al.
U.S. Appl. No. 09/689,785, filed Oct. 13, 2000, Sadowski.
U.S. Appl. No. 09/689,786, filed Oct. 13, 2000, Sadowski.

* cited by examiner

604

```
┌─────────────────────────┐
│ Based on the complexity │ 701
│ of the geometry chunks  │
│ in the frame, divide    │
│ the compositing window  │
│ into subareas           │
└─────────────────────────┘
            │
            ▼
┌─────────────────────────┐
│ Store parameters that   │ 702
│ define the compositing  │
│ window and the          │
│ subareas                │
└─────────────────────────┘
            │
            ▼
┌─────────────────────────┐
│ Identify the minimal    │ 704
│ number of parameters    │
│ that are required to    │
│ define the compositing  │
│ window and the subareas │
│ and communicate the     │
│ parameters to the PGUs  │
└─────────────────────────┘
```

FIG. 7

US 7,358,974 B2

METHOD AND SYSTEM FOR MINIMIZING AN AMOUNT OF DATA NEEDED TO TEST DATA AGAINST SUBAREA BOUNDARIES IN SPATIALLY COMPOSITED DIGITAL VIDEO

CROSS-REFERENCE TO RELATED APPLICATIONS

This patent application claims priority to the following provisional patent application:

"Method and System for Minimizing an Amount of Data Needed to Test Data Against Subarea Boundaries in Spatially Composited Digital Video," Serial No. 60/264,254, filed Jan. 29, 2001, incorporated herein by reference in its entirety.

This patent application is related to the following commonly owned, co-pending U.S. utility patent applications:

1. "Method and System for Minimizing an Amount of Data Needed to Communicate Information in Spatially Composited Digital Video," Ser. No. 09/689,784, filed Oct. 13, 2000, incorporated herein by reference in its entirety;

2. "Method and System for Spatially Compositing Digital Video Images with a Tile Pattern Library," Ser. No. 09/689,785, filed Oct. 13, 2000, incorporated herein by reference in its entirety; and 3. "Method and System for Spatially Compositing Digital Video Images with Coarse Tiles," Ser. No. 09/689,786, filed Oct. 13, 2000, incorporated herein by reference in its entirety.

BACKGROUND OF THE INVENTION

1. Field of the Invention

The present invention relates generally to computer graphics technology.

2. Background Art

Among the many functions that can be performed on personal and workstation computers, the rendering of images has become one of the most highly valued. The ever advancing demand for increasingly sophisticated image rendering capabilities has pulled the development of both hardware and software technologies towards meeting this end. Indeed, computer graphics applications have facilitated the introduction of multi-processors (or graphics units) into the designs of personal and workstation computers.

To increase rendering speed, computer graphics processes have been decomposed into standard functions performed in sequential stages of a graphics pipeline. At least one processor (or graphics unit) operates on each stage. As each stage completes its specific function, the results are passed along to the next stage in the pipeline. Meanwhile, the output of a prior stage (relating to the next frame in the sequence) is received. In this manner, the rendering speed of the overall process is increased to equal the processing speed of the slowest stage. Stages can be implemented using hardware, software, firmware, or a combination thereof.

Computer graphics pipelines can include, among other things, a geometry stage and a rasterizer stage. An application passes graphics data to a computer graphics pipeline. For example, an application may determine the image to be rendered and model the three-dimensional curvilinear form of each object in the image as a three-dimensional assembly of interconnected two-dimensional polygons (or any other type of primitive) that approximates the shape of the object. Each polygon is defined by a set of coordinates and an outwardly pointing vector normal to the plane of the polygon.

The geometry stage acts on the graphics data it receives from the application. The geometry stage often is further decomposed into more functional stages, each of which can have an associated processor to perform operations. For example, these stages can include, but are not limited to, a model and view transform stage, a light and shading stage, a projection stage, a clipping stage, a screen mapping stage, and others. The rasterizer stage uses the results of the geometry stage(s) to control the assignment of colors to pixels as the image is rendered.

As computer graphics has matured as a technology, approaches have been created to coordinate paths of development, to ensure compatibility among systems, and to reduce the amount of investment capital necessary to further the state of the art. These approaches allow designers a fair degree of leeway in choosing between hardware, software and firmware technologies to perform specific functions. Therefore, for a given hardware architecture, much of the current efforts in developing computer graphics centers on means to optimize the processing power of the given architecture.

The use of multiple processors in computer graphics hardware not only enables stages in a graphics pipeline to be processed simultaneously, but also allows for additional graphics pipelines for parallel processing. Graphics architectures have utilized these additional pipelines to process succeeding frames of images to support changes in a scene with time. Where the computer graphics hardware has "n" pipelines, each pipeline processes every $n^{th}$ frame in a sequence of frames. Each pipeline renders all of the objects and the background in a single frame. Often the outputs of the pipelines are multiplexed together to increase further the speed at which a sequence of frames is rendered. This process is known as temporal compositing, as image outputs from the pipelines are combined with respect to time.

While temporal compositing marks a major advancement in computer graphics performance, there are situations in which this approach may not optimize the processing power of the given architecture. Optimal temporal compositing, for a given number of graphics pipelines, depends on the relationship between the rendering speed of a given pipeline and the rate at which image outputs can be combined. A higher degree of image complexity, caused by additional features or geometrical entities (e.g., edges, polygons, etc) to improve the quality of the image, can reduce the speed at which a frame of an image is rendered by a graphics pipeline. This, in turn, lowers the rate at which image outputs can be combined.

Another problem posed by the temporal compositing process arises when the rendered images reside in an interactive environment. In an interactive environment, a user viewing a sequence of frames of images is permitted to supply a feedback signal to the system. This feedback signal can change the images that are rendered. In a temporal compositing system, there is a substantial delay between the time at which the user provides the feedback signal and the time at which the system responds to it. The user supplies the feedback signal at a particular frame to one of the pipelines in the system. Because the other pipelines are already in the process of rendering their pre-feedback frames, the system typically imposes a time delay to allow the other pipelines to complete their rendering of these frames before acting on the feedback signal.

Another type of compositing, called spatial compositing, also marks a major advancement in computer graphics performance. Like temporal compositing, spatial compositing relates to an approach to optimizing the utilization of multiple graphic units, and thus multiple pipelines. Rather than having each graphics unit or pipeline render an entire frame or a sequence of frames and having the output of each graphics unit combined temporally, spatial compositing uses each graphics unit to render a portion of each overall frame and combines the output of each graphics unit spatially with respect to the location of the rendered portion within the overall frame. By reducing the amount of graphics data (which may include geometry data) communicated to each graphics unit, spatial compositing increases the rate at which an overall frame is rendered.

In spatial compositing, optimization depends on the ability of the system to balance the processing load among the different graphics units. The processing load typically is a direct function of the size of a given subarea and a function of the rendering complexity for objects within this subarea. The more complex an object is, typically the more geometrical entities (and thus, geometric data) is used to represent the object. Load balancing strives to measure these variables and adjust, from frame to frame, the number, sizes, and positions of the subareas as necessary to balance the processing load (i.e., determine the current subarea boundaries). The cost of this approach is the necessity to communicate, in conjunction with each frame, the number, sizes, and positions of subareas being used for that given frame.

Where spatial compositing involves the use of a large number of subareas and/or complex graphics data, this can add substantially to the overhead information that must be communicated for each frame of spatially composited digital video. This situation compounds an already difficult problem with state of the art computer hardware technologies. As advancements in memory capacities and processor speeds have outstripped improvements in interconnect bus throughputs, data links have become bottlenecks of serious concern.

BRIEF SUMMARY OF THE INVENTION

The present invention provides a method and system for minimizing an amount of data needed to test data against subarea boundaries in spatially composited digital video. Once the current subarea boundaries are determined, optimization then depends on determining the correct granularity for testing graphics data against the current subarea boundaries. The present invention tests graphics data against subarea boundaries to determine which subarea, and thus graphics unit assigned to that subarea, is responsible to render the graphics data. The greater the granularity that can be used for testing graphics data against the current subarea boundaries, the less amount of data that is communicated to each graphics unit, thereby optimizing the processing power of the given architecture. Sending all of the graphics data to each graphics unit prevents the application from seeing any increase in the rate at which an overall frame is rendered. Yet, it is important that any calculations performed by the present invention do not take so long that they become the bottleneck.

The present invention includes a method and a system for minimizing an amount of data needed to test graphics data against subarea boundaries in spatially composited digital video. The present invention utilizes the concept of a bounding region in order to delay communicating detailed graphics data (which may include geometric data) to the subareas until the present invention determines which subarea(s) are responsible to render the graphics data. Shapes, sizes, and/or positions of the subareas can define a compositing window along with the subarea boundaries. Graphics data may be represented by pixels, where each pixel may store color data, texture data, intensity data and so forth. Therefore, if only the parameters that define the bounding region (i.e., defines the space the geometry chunk occupies on the compositing window) are communicated, it is possible to delay the need to communicate the detailed graphics data until it is determined which subarea will render the geometry represented by the particular bounding region. Note that any common coordinate space that is convenient or efficient may be used.

In another embodiment of the present invention, a system for minimizing an amount of data needed to test a geometry chunk in a frame against subarea boundaries in a compositing window includes a geometry distributor and one or more graphics units. The geometry distributor defines a bounding region for the geometry chunk, where the bounding region defines the space the geometry chunk occupies on the compositing window. The graphics units are assigned to the subareas in the compositing window. The geometry distributor sends a bounding region to each of the graphics units to determine which graphics unit will render the geometry chunk defined by the bounding region. Once this is determined, the geometry distributor communicates the geometry chunk to the graphics unit that will render the geometry chunk.

Further embodiments, features, and advantages of the present invention, as well as the structure and operation of the various embodiments of the present invention, are described in detail below with reference to the accompanying figures.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 7 is a high level flowchart of a method for dividing the compositing window into subareas and conveying the defining parameters p according to an embodiment of the present invention.

Figure 1:
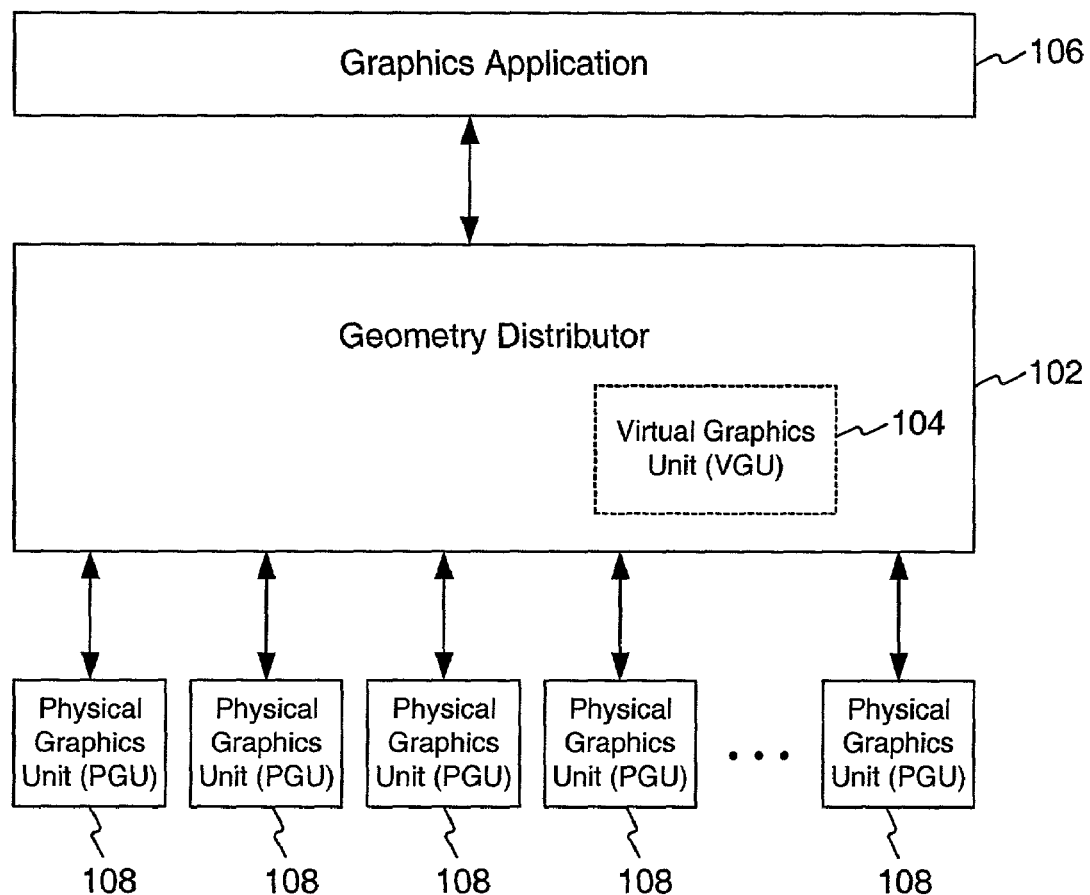
FIG. 1 is a block diagram of a geometry distributor system according to an embodiment of the present invention.

A preferred embodiment of the invention is described with reference to the figures where like reference numbers indicate identical or functionally similar elements. Also in the figures, the left most digit(s) (either the first digit or first two digits) of each reference number identify the figure in which the reference number is first used.

DETAILED DESCRIPTION OF THE INVENTION

Table of Contents

| | |
|---|---|
| I. | Overview |
| II. | Terminology |
| III. | System Architecture Overview |
| IV. | Environment of the Invention |
| V. | Software and Hardware Embodiments |
| VI. | Conclusion |

I. Overview

The present invention provides a method and system for minimizing an amount of data needed to test data against subarea boundaries in spatially composited digital video. A bounding region delays communicating detailed graphics data to the subareas until the present invention determines which subarea(s) are responsible to render the graphics data.

II. Terminology

Digital video images are a sequence of images presented for continuous viewing from a digital electronic format by a digital video display unit. The color, intensity, texture, and other information for each location on an image is represented by values stored in a pixel. Pixels in a display unit reside in an array of rows and columns.

Scanning is a process by which pixels are sequentially traversed. A single complete video image is referred to as a frame. In creating a frame, the computer graphics technology is said to render the image. To increase rendering speed, computer graphics processes have been decomposed into standard functions performed in sequential stages of a graphics pipeline. At least one processor or graphics unit operates on each stage.

The present invention relates to an approach to optimizing the utilization of multiple graphics units, and thus multiple pipelines. Rather than having each pipeline render an entire frame of a sequence of frames and having the output of each pipeline combined temporally, spatial compositing uses each pipeline to render a portion of each overall frame and combines the output of each pipeline spatially with respect to the location of the rendered portion within the overall frame. By reducing the amount of graphics data that each processor must act on, spatial compositing increases the rate at which an overall frame is rendered.

A compositor is a component that performs compositing. Within a compositor may reside a frame buffer, a hardware device capable of receiving input data, storing it in memory organized to correspond to image pixels, and generating all or part of the data as an image. Whether or not a frame buffer resides in the compositor may depend on the particular compositing operations supported by the compositor. The portion of the frame buffer presented for viewing is designated as the display area. In spatial compositing, a compositing window is located within all or a part of the display area. The compositing window is divided, or decomposed, into non-overlapping portions called subareas. Each subarea receives the output of an assigned pipeline/graphics unit to effect spatial compositing.

Whereas with temporal compositing, heavy loading of a pipeline processor reduces the rate at which frames are rendered, with spatial compositing this rate is increased to that of the slowest pipeline. Therefore, optimization depends on the ability of the system to balance the processing load among the different pipelines. The processing load typically is a direct function of the size of a given subarea and a function of the rendering complexity for objects within this subarea. Complexity results when features or geometrical entities (e.g., edges, polygons, etc) are added to an image to improve its quality.

One approach to load balancing strives to measure these variables and adjust, from frame to frame, the number, sizes, and positions of the subareas as necessary to balance the processing load. The cost of this approach is the necessity to communicate, in conjunction with each frame, the number, sizes, and positions of subareas being used for that given frame. A method and system for minimizing an amount of data needed to communicate subarea boundaries in spatially composited digital video was discussed in detail in commonly owned, co-pending patent application with Ser. No. 09/689,784.

Once the number, sizes, and positions of the subareas are communicated, the present invention must distribute the graphics data to the subareas for each subarea to determine whether it is to render the data (e.g., whether the data is within its subarea boundaries). The cost of this approach is the necessity to communicate all graphics data in a frame to each subarea. Where spatial compositing involves the use of a large number of subareas, this can add substantially to the overhead information that must be communicated for each frame of spatially composited digital video. This situation compounds an already difficult problem with state of the art computer hardware technologies. As advancements in memory capacities and processor speeds have outstripped improvements in interconnect bus throughputs, data links have become bottlenecks of serious concern. The present invention utilizes the concept of a bounding region in order to delay communicating detailed graphics data to the subareas until the present invention determines which subarea(s) are responsible to render the graphics data.

One or more geometrical entities make up the objects displayed in a frame. A geometrical entity is represented by graphics data. Graphics data may be represented by a grouping of pixels. A piece of geometry may be an object, a polygon, a group of polygons, part of a scene, a scene, and so forth. An object is any item that can be individually selected and manipulated. This includes shapes and pictures on a digital video display unit. A polygon is defined by a set of coordinates and an outwardly pointing vector normal to the plane of the polygon.

A geometry chunk is one or more pieces of geometry communicated at a time to the present invention by a graphics application. Thus, geometry chunks also must communicate the number, sizes and positions of each of its pieces of geometry. Geometry chunks are provided to the present invention from a computer graphics application.

A bounding region is created for each geometry chunk and defines the space the geometry chunk occupies on the compositing window. The space may be represented as, but is not limited to, screen space, world space or object space. In fact, any coordinate space that is efficient or convenient to the particular implementation may be utilized. As used herein world space and object space refer to three dimensional space, whereas screen space refers to two dimensional space. Further, a subarea may be referred to as a tile in two dimensional space and a sub-volume in three dimensional space.

In screen space, the shape and size of the compositing window; the shape, size, and position of each of the subareas; and the shape, size and position of the pieces of geometry can be defined by parameters that characterize the two-dimensional contours. Parameters can include, but are not limited to, coordinate points for corners, centers, or focal points; lengths of radii; interior angles; and degrees of curvature. For example, the application may determine the image to be rendered and model each object as an assembly of two-dimensional polygons (or any other type of primitive) that approximates the shape of the object.

In world space, the shape and size of the compositing window; the shape, size, and position of each of the subareas; and the shape, size and position of the pieces of geometry can be defined by parameters that characterize the three-dimensional contours. Here, the application may determine the image to be rendered and model each object as a three-dimensional assembly of interconnected two-dimensional polygons.

Finally, object space goes one step further than world space by taking world space and putting the object into its own space. Here, the bounding region is calculated in the same space as the pieces of geometry that were provided by the graphics application.

Further optimization of a spatial compositing process requires a method and system for minimizing the amount of data needed to test graphics data against subarea boundaries in order to determine which subarea will render the graphics data.

III. System Architecture Overview

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, a graphics application 106, a geometry distributor 102, a virtual graphics unit (VGU) 104 and one or more of physical graphics unit (PGUs) 108 are shown. An embodiment of the functional modules or components of the present invention includes geometry distributor 102 and one or more of PGU 108. Each PGU 108 may further be comprised of multiple graphics pipelines.

Computer graphics application 106 is any application that produces graphics data for display on a screen. Graphics application 106 interacts with geometry distributor 102 to provide to it graphics data (or geometry) to render.

Geometry distributor 102 is the engine of the present invention. Geometry distributor 102 receives graphics data from graphics application 106 and distributes the data to one or more of PGU 108. Geometry distributor 102 also includes VGU 104. VGU 104 is the interface between graphics application 106 and geometry distributor 102. It is the function of VGU 104 to interface with graphics application 106 such that graphics application 106 believes it is interacting with one graphics unit. In actuality, the rendering of the graphics data in a frame is done by one or more of PGU 108.

Typically, one PGU 108 renders graphics data to be displayed on one subarea of the compositing window, although the present invention is not limited to this. Geometry distributor 102, and thus VGU 104, may be implemented using hardware, software, firmware, or a combination thereof.

Figure 2:
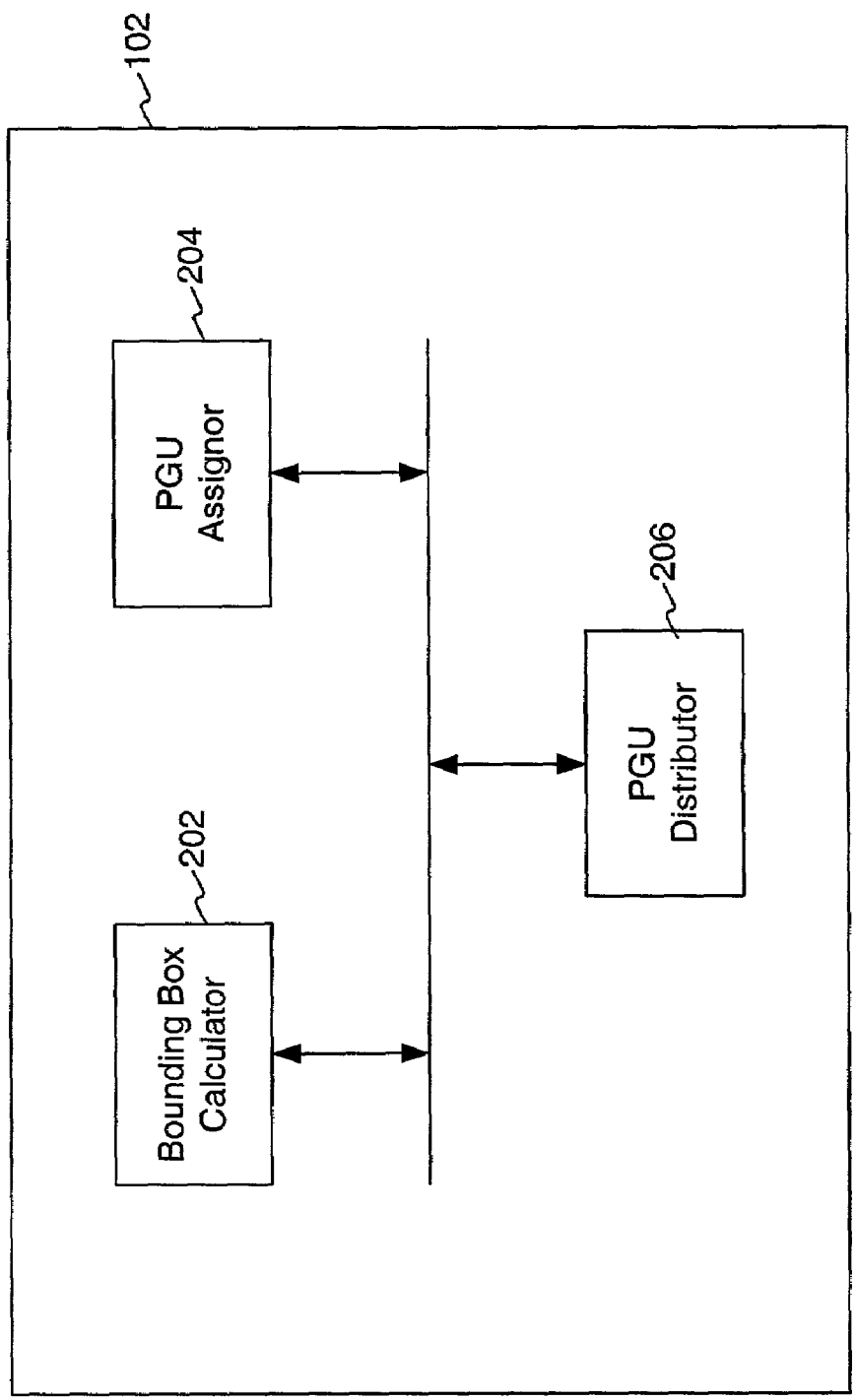
FIG. 2 is a high-level block diagram of the geometry distributor according to an embodiment of the present invention.

In FIG. 2, geometry distributor 102 includes a bounding region calculator 202, a PGU assignor 204 and a PGU distributor 206. Bounding region calculator 202, PGU assignor 204 and PGU distributor 206 may be implemented using hardware, software, firmware, or a combination thereof. Each of these components will be described next.

Bounding region calculator 202 calculates a bounding region for each geometry chunk provided by graphics application 106. A bounding region defines the space the geometry chunk occupies on the compositing window. Bounding regions continue to define the space occupied by the geometry chunk as the geometry chunk is being moved around the compositing window. Each subarea (or PGU 108 rendering the graphics data for the subarea) receives the bounding region and determines whether the geometry chunk defined by the bounding region overlaps its subarea boundaries. Bounding regions only keep track of the dimensions that define the region. Thus, the present invention only sends the bounding region (or dimensions that define the region) to each of the PGU 108 to determine whether the bounding region dimensions overlap its subarea. Here, there is no need to communicate the details of the graphics data until it is determined which PGU 108 will be rendering the graphics data. This allows the present invention to reduce the amount of graphics data that is communicated to one or more of PGU 108. This limits the amount of overhead information that must be passed through any communication infrastructure (including but not limited to busses) that interconnects the central processing unit and various peripheral chips that support computer graphics.

PGU assignor 204 is responsible to assign one PGU 108 to one of the subareas, although this is not meant to limit the present invention. It should be apparent to one skilled in the art that more than one PGU 108 could be assigned to portions of one subarea, one PGU 108 could be assigned to multiple subareas, and so forth.

Figure 3:
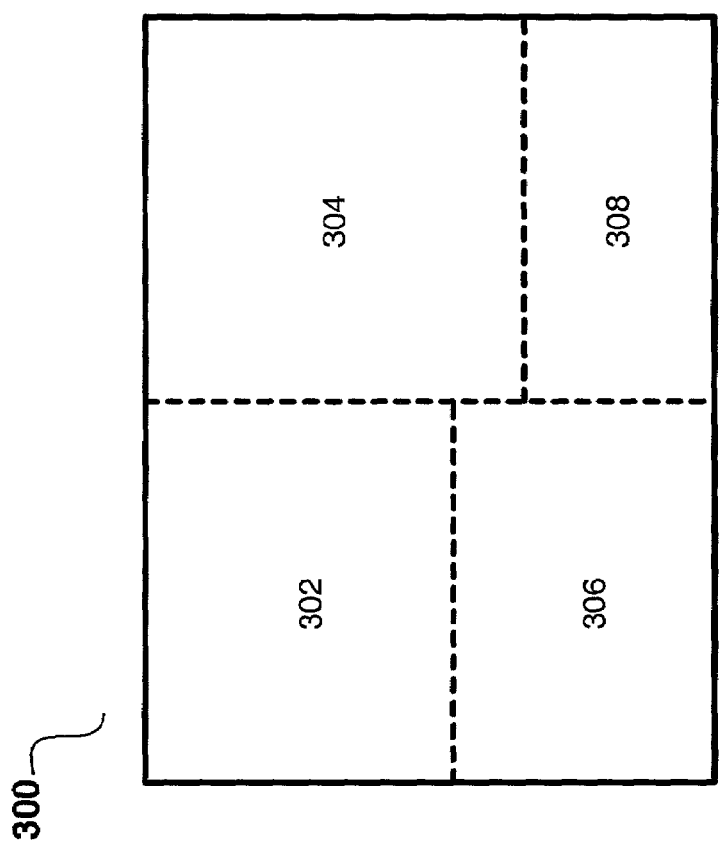
FIG. 3 presents an arbitrary two dimensional compositing window decomposed into four subareas or tiles.

Finally, PGU distributor 206 pushes the graphics data into the appropriate PGU 108. Alternatively, PGU 108 could request the graphics data from PGU distributor 206. The compositing window of the present invention will be described next.

Where the compositing window and each of the subareas have polygon shapes, coordinates for the corners can be used as the parameters that define the compositing window and each of the subareas, though one skilled in the art will recognize that there are many other means by which polygon shaped compositing windows and subareas can be characterized. FIG. 3 presents a rectangular compositing window 300 decomposed into four subareas: subarea 302, subarea 304, subarea 306, and subarea 308. Compositing window 300 and subareas 302-308 are shown in two dimensional space. Rectangular compositing windows and subareas are used in conventional approaches to spatial compositing. It is desirable to minimize the amount of data necessary to be communicated to define the compositing window and each of the subareas. This also limits the amount of overhead information that must be passed through any communication infrastructure (including but not limited to busses) that interconnects the central processing unit and various peripheral chips that support computer graphics.

Figure 4:
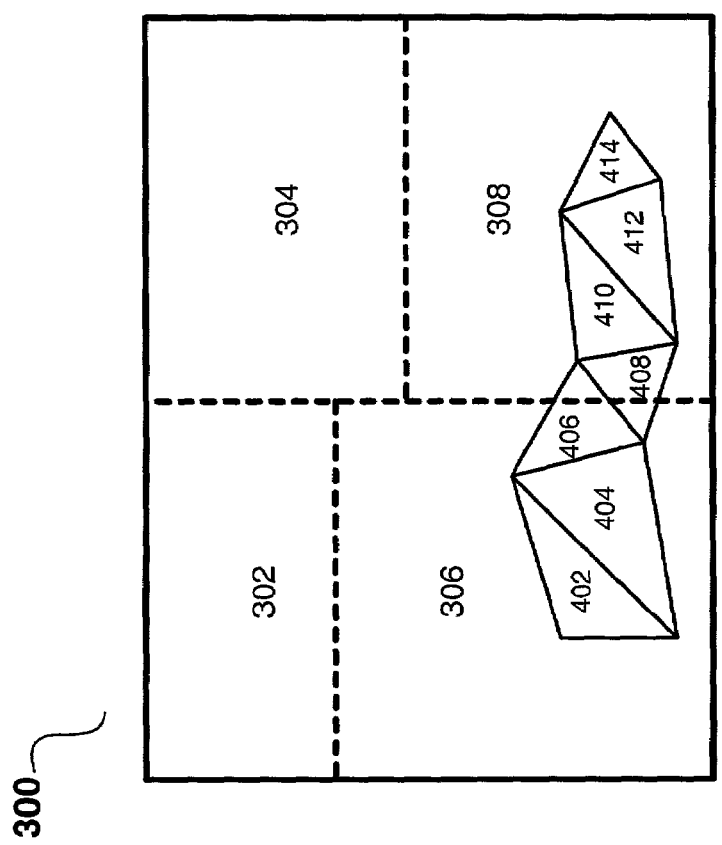
FIG. 4 presents the compositing window of FIG. 3 including geometrical entities in a frame.

FIG. 4 presents compositing window 300 of FIG. 3 illustrating bounding regions (e.g., boxes) that define geometry chunks for a particular frame. These bounding regions include bounding region 402 though bounding region 414. According to the present invention, the graphics data (or geometry chunks) contained in bounding regions 402, 404, 406 and 408 will be rendered by the PGU 108 assigned to subarea 306. The graphics data contained in bounding regions 406, 408, 410, 412 and 414 will be rendered by the PGU 108 assigned to subarea 308. Note that in an embodiment of the present invention, the graphics data defined by bounding region 406 and 408 are rendered by the PGU 108 assigned to subarea 306 and the PGU 108 assigned to subarea 308. This is due to bounding region 406 and 408 overlapping the boundaries of both subarea 306 and subarea 308.

Figure 5:
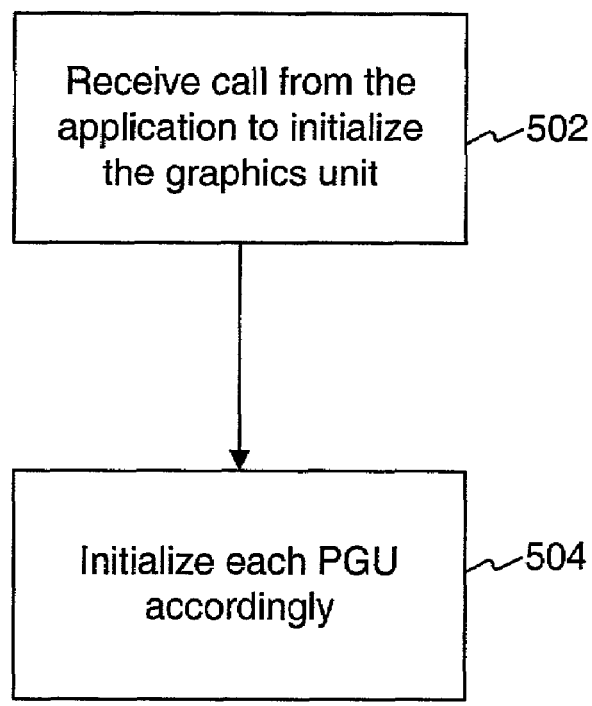
FIG. 5 is a high level flowchart representation of a method for initializing the physical graphics units (PGU) according to an embodiment of the present invention.

As described above, graphics application 106 believes it is interfacing with a single graphics unit. Therefore, every command that graphics application 106 issues, geometry distributor 102 must broadcast that command to all of PGUs 108. FIG. 5 is a high level flowchart representation of a method for initializing the PGUs 108 according to an embodiment of the present invention. In FIG. 5, at a step 502, geometry distributor 102, via VGU 104, receives a command from graphics application 106 to initialize the graphics unit. Control then passes to step 504.

At a step 504, geometry distributor 102 broadcasts the initialize command to each of the PGUs 108. The flowchart in FIG. 5 ends at this point.

Figure 6:
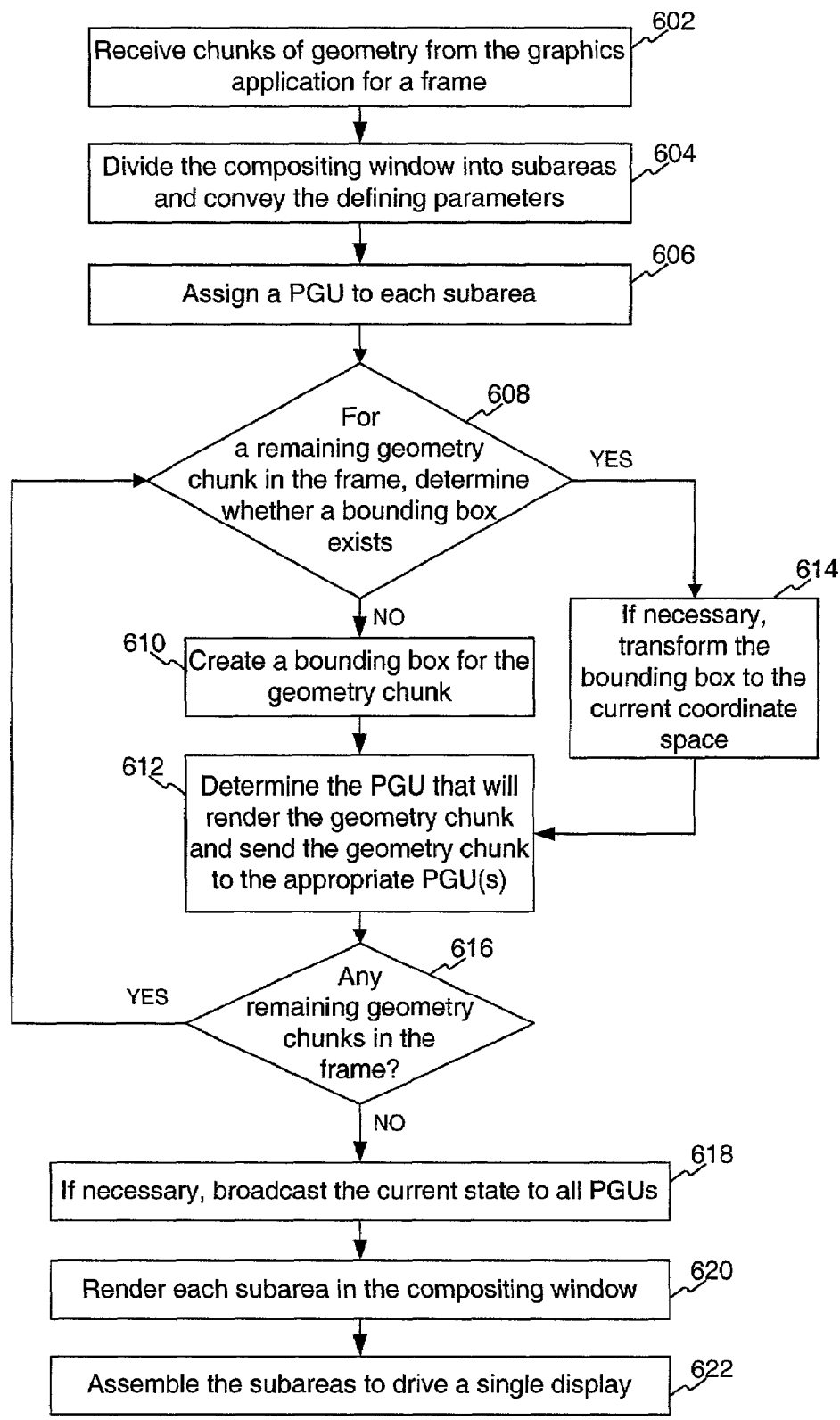
FIG. 6 is a high level flowchart representation of a method for minimizing an amount of data needed to test graphics data against subarea boundaries in spatially composited digital video according to an embodiment of the present invention.

FIG. 6 is a high level flowchart representation of a method for minimizing the amount of data needed to test graphics data against subarea boundaries in spatially composited digital video according to an embodiment of the present invention. In FIG. 6, at a step 602, geometry distributor 102 receives chunks of geometry from graphics application 106 for a frame. As explained above, a geometry chunk is one or more pieces of geometry communicated at a time from graphics application 106. Geometry chunks must also store information relating to the number, sizes and positions of each of its pieces of geometry, along with the actual graphics data that defines each piece of geometry. Control then passes to step 604.

At a step 604, geometry distributor 102 divides the compositing window into subareas and conveys the defining parameters to each of the PGUs 108. Step 604 is described in more detail below with reference to FIG. 7. Control then passes to step 606.

At a step 606, PGU assignor 204 (FIG. 2) assigns one or more of PGU 108 to each of the subareas defined in step 604. FIG. 6 shows steps 604 and 606 being executed for each new frame. Alternatively, steps 604 and 606 may be executed only once for the duration of the execution of graphics application 106. Graphics application 106 may also be either directly or indirectly in control of steps 604 and 606 and thus determines how often these steps are executed. Control then passes to step 608.

At a step 608, geometry distributor 102 looks at one of the geometry chunks in the frame and determines whether a bounding region exits for that particular geometry chunk. Once the present invention creates a bounding region for a geometry chunk, the bounding region is stored for future frames that may require the same geometry chunk to be rendered. Alternatively, graphics application 106 may provide the necessary information to the present invention to create a bounding region for a geometry chunk. If in step 608 geometry distributor 102 determines that a bounding region already exists for the geometry chunk, then control passes to step 614. Alternatively, control passes to step 610.

At a step 614, the present invention compares the current space (e.g., screen, world or object space) and the space in which the bounding region was created. If the space in which the bounding region was created is not the same as the current space, then the present invention transforms the bounding region to the correct coordinate space. Control then passes to step 612.

At a step 610, it was determined in step 608 that a bounding region did not exist for the geometry chunk being processed. Therefore, bounding region calculator 202 (FIG. 2) calculates the bounding region for the geometry chunk and stores it in memory for possible future use. Where the space is two dimensional and the bounding region has a polygon shape, coordinates for the corners can be used as the parameters that define the bounding region, though one skilled in the art will recognize that there are many other means by which a polygon shaped bounding region can be characterized. How the present invention calculates bounding regions is described in more detail with reference to FIGS. 8-10 below. Control then passes to step 612.

At a step 612, the present invention determines which PGU(s) 108 will render the geometry chunk. Once determined, PGU distributor 206 (FIG. 2) distributes or pushes the geometry chunk to the appropriate PGU(s) 108. How the present invention determines which PGU(s) 108 will render the geometry chunk is described in more detail with reference to FIG. 11 below. Control then passes to step 616.

At a step 616, geometry distributor 102 determines if there are any remaining geometry chunks in the current frame that have not been processed. If so, then control passes back to step 608 to process another geometry chunk in the frame. Alternatively, control passes to step 618.

At a step 618, geometry distributor 102 determines whether it is necessary to broadcast the current state of the frame to all of the PGUs 108. One problem posed by the spatial compositing process arises when the rendered images reside in an interactive environment. In an interactive environment, a user viewing a sequence of frames of images is permitted to supply a feedback signal to the system. This feedback signal can change the images that are rendered. There may be a substantial delay between the time at which the user provides the feedback signal and the time at which the system responds to it. The user supplies the feedback signal at a particular frame to one of the PGUs 108 (or pipelines) in the system. Because the other PGUs 108 are already in the process of rendering their subarea in pre-feedback frames, the system typically imposes a time delay (or broadcasts the current state of the frame) to allow the other PGUs 108 to complete their rendering of these frames before acting on the feedback signal. Control then passes to step 620.

At a step 620, each PGU 108 renders its subarea in the compositing window. It is important to note that it is not necessary for all of the PGUs 108 to render their subarea at the same time. Control then passes to step 622.

At a step 622, a compositor assembles the subareas to drive a single display for graphics application 106. A compositor is a component that performs compositing. Within a compositor there may reside a frame buffer, a hardware device capable of receiving input data, storing it in memory organized to correspond to image pixels, and generating all or part of the data as an image. The flowchart in FIG. 6 ends at this point.

Communications to a compositor can occur through a variety of means recognizable to one skilled in the art. To facilitate the use of high performance digital displays while still supporting legacy analog technology, the Digital Visual Interface (DVI) standard has been developed to establish a protocol for communications between central processing units and peripheral graphics chips. Therefore, in a preferred embodiment, the communications medium uses the DVI standard. Within the DVI standard, communications of compositing window and subarea parameters can be realized via a Transitional Minimized Differential Signal (TMDS) data link or an Inter Integrated Circuit (I²C) bus. The present invention can support communications through a system using either of these channels. Frames of digital video images are typically transmitted via a TMDS data link. In one embodiment, parameters can be embedded within a transmitted frame of digital video images. In this case, the parameter data are stored in the frame buffer in an area outside of the display area.

Step 604 of FIG. 6, where geometry distributor 102 divides the compositing window into subareas, is now described in more detail with reference to FIG. 7. In FIG. 7, at a step 701, geometry distributor 102 looks at the complexity of the geometric chunks in the frame and where they fall on the compositing window. The geometry distributor 102 then divides the compositing window into subareas such that the processing load is balanced as much as possible between the subareas (and thus the PGUs 108). The processing load is typically is a direct function of the size of a given subarea and a function of the rendering complexity for geometry chunks (or pieces of geometry) within this subarea. Control then passes to step 702.

At a step 702, parameters that define the shape and size of the compositing window and parameters that define the shape, size, and position of each of the subareas are stored. The compositing window and each of the subareas are formed by pixels within the display area. Where the compositing window has a polygon shape, coordinates for the corners can be used as the parameters that define the compositing window, though one skilled in the art will recognize that there are many other means by which a polygon shaped compositing windows can be characterized. Control then passes to step 704.

It is desirable to minimize the amount of overhead information that must be passed through any communication infrastructure (including but not limited to busses) that interconnects the central processing unit and various peripheral chips that support computer graphics. At a step 704, a minimal number of parameters that are necessary to define the compositing window are identified from the stored parameters that define the compositing window and its subareas and communicated to the PGUs 108. The minimal number of necessary parameters depends on the shape and size of the compositing window and the shape, size, and position of each of the subareas. The present invention is not limited to a minimal number of parameters. Additional parameters beyond the minimal number needed to define the compositing window and each of the subareas can be used as desired. The flowchart in FIG. 7 ends at this point.

Figure 8:
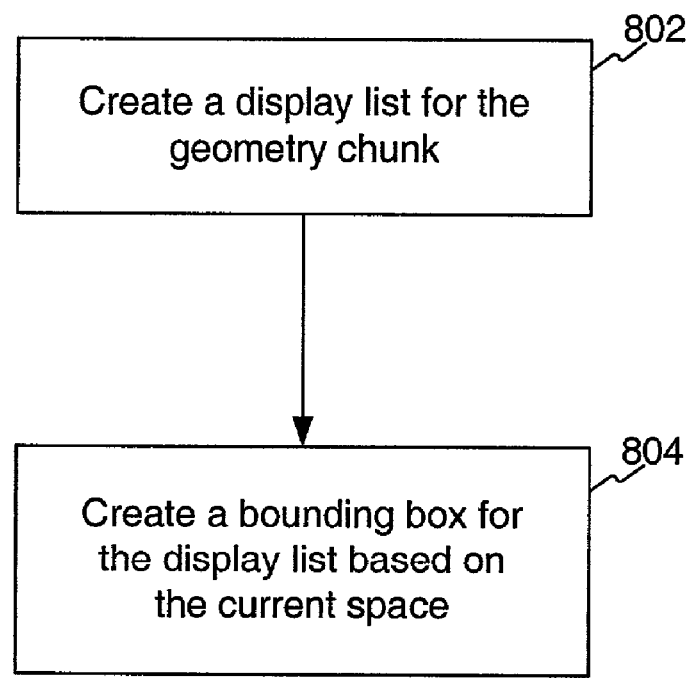
FIG. 8 is a high level flowchart of a method for creating a bounding region for a geometry chunk according to one embodiment of the present invention.
Figure 9:
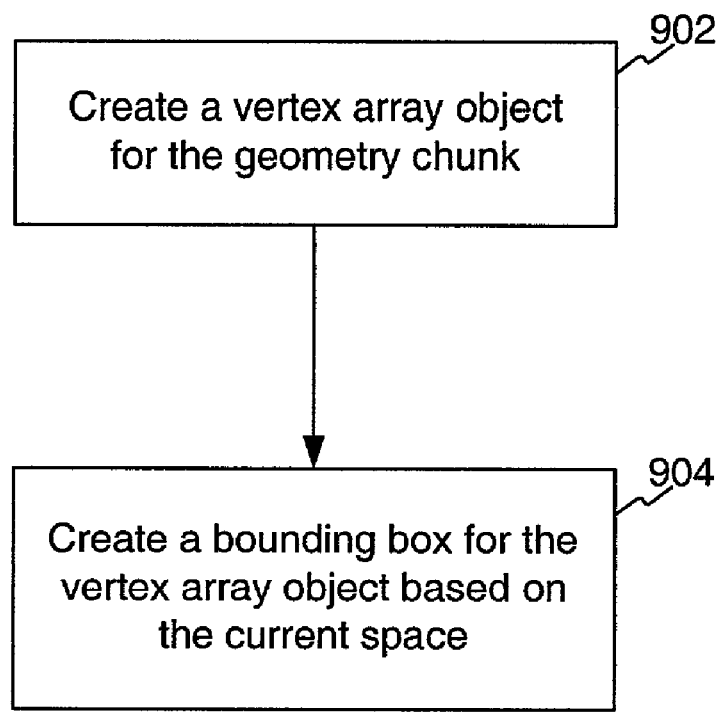
FIG. 9 is a high level flowchart of a method for creating a bounding region for a geometry chunk according to another embodiment of the present invention.
Figure 10:
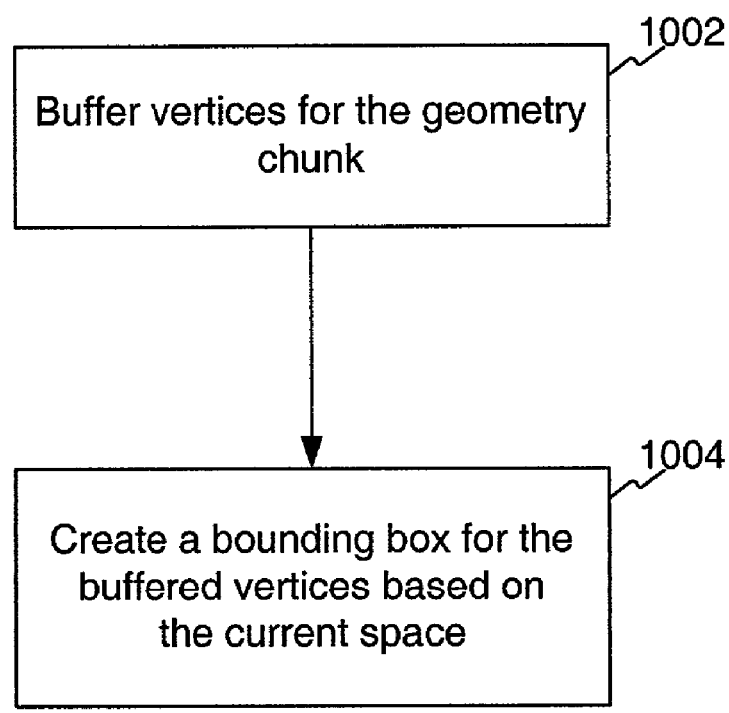
FIG. 10 is a high level flowchart of a method for creating a bounding region for a geometry chunk according to yet another embodiment of the present invention.

Ways in which the present invention may calculate bounding regions (step 610 in FIG. 6) are described next in more detail with reference to FIGS. 8-10. In FIG. 8, at a step 802, geometry distributor 102 creates a display list for the geometry chunk. All of the graphics data for the geometry chunk are stored in the display list. Control then passes to step 804.

At a step 804, since display lists are atomic, bounding region calculator 202 creates a bounding region for the display list when it is created. The bounding region created is dependent on the current space (e.g., screen, world, and object). The flowchart in FIG. 8 ends at this point.

In another embodiment of the present invention, a vertex array object is used in place of the display list. This is shown with reference to FIG. 9. In FIG. 9, at a step 902, geometry distributor 102 creates a vertex array object for the geometry chunk. All of the graphics data for the geometry chunk is stored in the vertex array object. Control then passes to step 904.

At a step 904, bounding region calculator 202 creates a bounding region for the vertex array object based on the current space. The flowchart in FIG. 9 ends at this point.

In yet another embodiment of the present invention, vertices are buffered for the geometry chunk. This is shown with reference to FIG. 10. In FIG. 10, at a step 1002, geometry distributor 102 buffers vertices for the geometry chunk. All of the graphics data for the geometry chunk is stored in the buffered vertices. Control then passes to step 1004.

At a step 1004, bounding region calculator 202 creates a bounding region for the buffered vertices based on the current space. The flowchart in FIG. 10 ends at this point.

Figure 11:
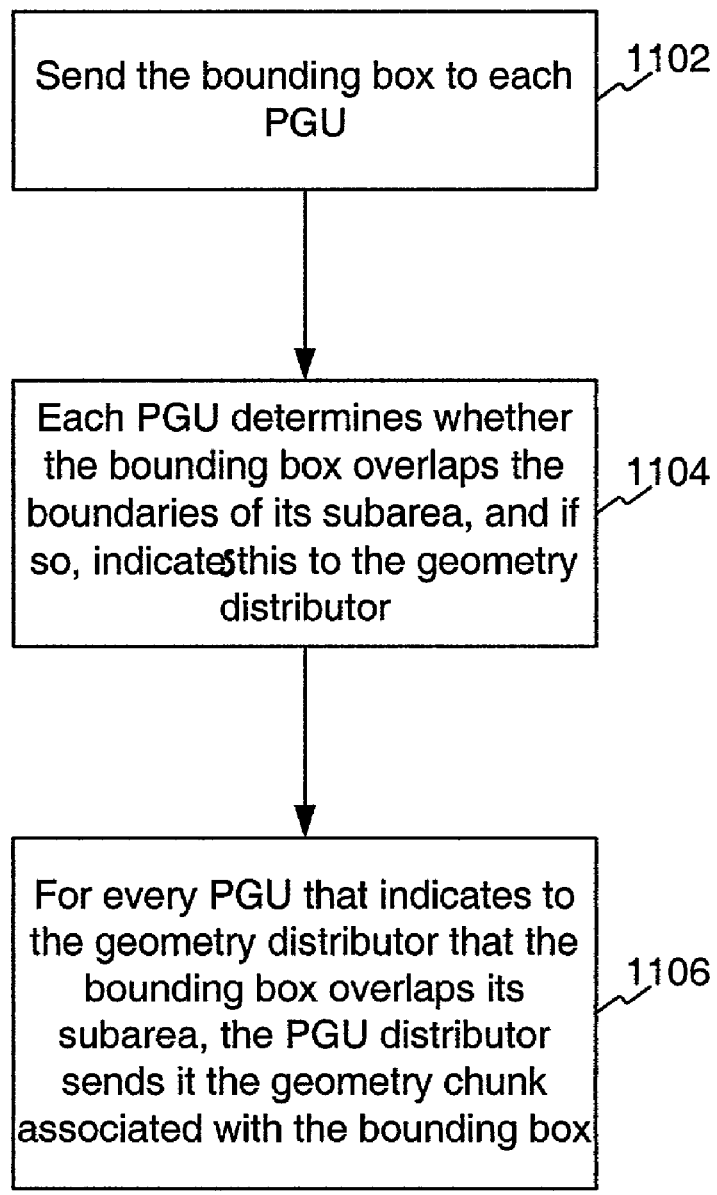
FIG. 11 is a high level flowchart of a method for determining which PGU(s) will render a geometry chunk according to an embodiment of the present invention.

FIG. 11 is a flowchart of the method for determining which PGU(s) 108 will render the geometry chunk according to an embodiment of the present invention (step 612 of FIG. 6). In FIG. 11, at a step 1102, geometry distributor 102 sends the bounding region to each of the PGUs 108. Recall that the bounding region only defines the space the geometry chunk occupies on the compositing window. Therefore, when sending the bounding region to the PGUs 108, no graphics data that defines the geometry chunk is included. Sending all of the graphics data in the frame to each PGU 108 prevents the application from seeing any increase in the rate at which an overall frame is rendered. Control then passes to step 1104.

At a step 1104, each PGU 108 determines whether the bounding region overlaps the boundaries of its subarea, and if so, indicates this to geometry distributor 102. Control then passes to step 1106.

At a step 1106, PGU distributor 206 (FIG. 2) distributes the actual geometry chunk to each PGU 108 that indicates to geometry distributor 102 that the bounding region overlaps its subarea. At this point the flowchart in FIG. 11 ends.

IV. Environment of the Invention

Figure 12:
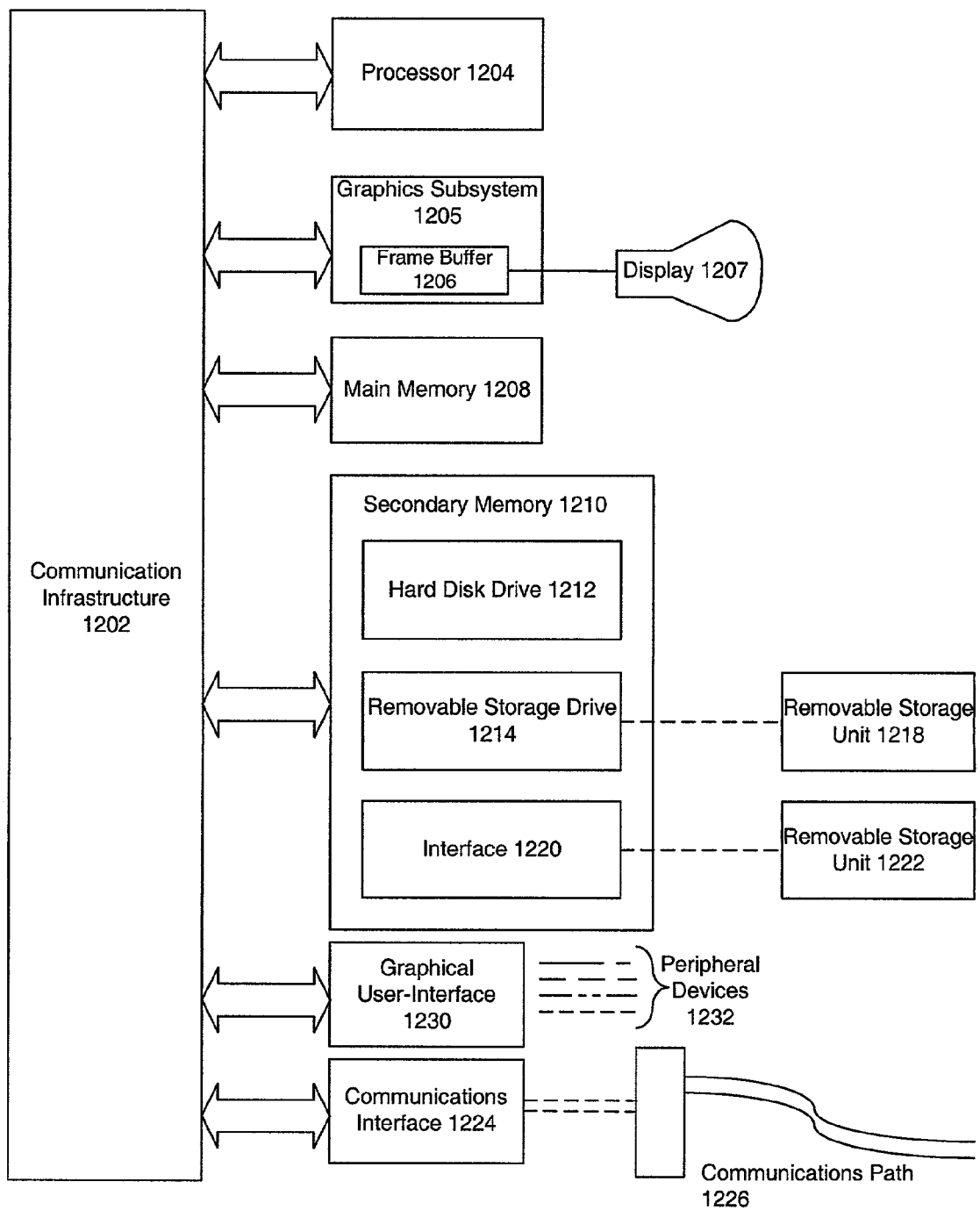
FIG. 12 is a block diagram of an example computer system that can support an embodiment of the present invention.

FIG. 12 is a block diagram of an example computer system that can support an embodiment of the present invention. The environment is a computer system 1200 that includes one or more processors, such as a central processing unit (CPU) 1204. The CPU 1204 is connected to a communications infrastructure 1202. Various software embodiments are described in terms of this example computer system. After reading this description, it will be apparent to a person skilled in the relevant art how to implement the invention using other computer systems and/or computer architectures.

Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218 represents a floppy disk, magnetic tape, optical disk, etc., which is read by and written to by removable storage drive 1214. As will be appreciated, the removable storage unit 1218 includes a computer usable storage medium having stored therein computer software and/or data.

In alternative embodiments, secondary memory 1210 may include other similar means for allowing computer programs or other instructions to be loaded into computer system 1200. Such means can include, for example, a removable storage unit 1222 and an interface 1220. Examples can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

The communications interface 1224 allows software and data to be transferred between computer system 1200 and external devices via communications path 1226. Examples of communications interface 1224 can include a modem, a network interface (such as an Ethernet card), a communications port (e.g., RS-232), etc. Software and data transferred via communications interface 1224 are in the form of signals which can be electronic, electromagnetic, optical or other signals capable of being received by communications interface 1224 via communications path 1226. Note that communications interface 1224 provides a means by which computer system 1200 can interface to a network such as the Internet.

The computer system 1200 also includes conventional graphics hardware such as a graphics subsystem 1205 and a display 1207. Graphics subsystem 1205 includes a frame buffer 1206. In addition, computer system 1200 includes a graphical user-interface 1236 which includes peripheral devices 1232. Peripheral devices 1232, such as digitizer and a camera can be used for capturing images to process according to the present invention, although the present invention is not limited to these. Alternatively, images can be retrieved from any of the above-mentioned memory units, or via a communications interface 1224.

The present invention is described in terms of this example environment. Description in these terms is provided for convenience only. It is not intended that the invention be limited to application in this example environment. In fact, after reading the complete description, it will become apparent to a person skilled in the relevant art how to implement the invention in alternative environments.

V. Software and Hardware Embodiments

The present invention is preferably implemented using software running (that is, executing) in an environment similar to that described above with respect to FIG. 12.

Computer programs (also called computer control logic) are stored in main memory 1208 and/or secondary memory 1210. Computer programs can also be received via communications interface 1224. Such computer programs, when executed, enable the computer system 1200 to perform the features of the present invention as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard disk drive 1212 or communications interface 1224. Alternatively, the computer program product may be downloaded to computer system 1200 over communications path 1226. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

In other embodiments, the invention is implemented in software, hardware, firmware, or any combination thereof.

VI. Conclusion

While an embodiment of the present invention has been described above, it should be understood that it has been presented by way of example only, and not limitation. It will be understood by those skilled in the art that various changes in form and detail maybe made therein without departing from the spirit and scope of the invention as defined in the appended claims. Thus, the breadth and scope of the present invention should not be limited by the above-described exemplary embodiment, but should be defined only in accordance with the following claims and their equivalents.

What is claimed is:

1. A method for minimizing an amount of data needed to test a geometry chunk in a frame against subarea boundaries in a compositing window, comprising the steps of:

defining the geometry chunk with a bounding region, wherein said bounding region defines an outline of the geometry chunk;

storing data that defines said bounding region for use in processing the geometry chunk in a subsequent frame;

sending said data that defines said bounding region to graphics pipelines;

determining, from said data that defines said bounding region, a graphics pipeline of said graphics pipelines that will render the geometry chunk;

assigning a subarea in the compositing window to receive an output of said graphics pipeline; and communicating data associated with the geometry chunk to said graphics pipeline;

wherein said graphics pipelines are configured to render the frame by spatial compositing through parallel processing, said data that defines said bounding region is less than said data associated with the geometry chunk, and the geometry chunk is different from said subarea.

2. The method of claim 1, wherein the geometry chunk is comprised of a piece of a geometry provided by a graphics application.

3. The method of claim 1, wherein the geometry chunk is represented as a display list.

4. The method of claim 1, wherein the geometry chunk is represented as a vertex array object.

5. The method of claim 1, wherein the geometry chunk is represented as buffered vertices.

6. A system for minimizing an amount of data needed to test a geometry chunk in a frame against subarea boundaries in a compositing window, comprising:

graphics pipelines;

a geometry distributor configured to define a bounding region for the geometry chunk, to send data that defines said bounding region to said graphics pipelines to determine, from said data that defines said bounding region, a graphics pipeline of said graphics pipelines that will render the geometry chunk, to assign a subarea in the compositing window to receive an output of said graphics pipeline, and to communicate data associated with the geometry chunk to said graphics pipeline; and a memory configured to store said data that defines said bounding region for use in processing the geometry chunk in a subsequent frame;

wherein said bounding region defines an outline of the geometry chunk;

wherein said graphics pipelines are configured to render the frame by spatial compositing through parallel processing;

wherein said data that defines said bounding region is less than said data associated with the geometry chunk; and wherein the geometry chunk is different from said subarea.

7. The system of claim 6, further comprising a graphics application configured to provide the geometry chunk to said geometry distributor.

8. The system of claim 7, wherein said geometry distributor comprises a virtual graphics unit configured to interface with said graphics application.

9. The system of claim 6, wherein the geometry chunk is comprised of a piece of a geometry provided by a graphics application.

10. The system of claim 6, wherein said geometry distributor comprises:

a bounding region calculator configured to calculate said bounding region for the geometry chunk;

a graphics pipeline assignor configured to assign said graphics pipeline to said subarea in the compositing window; and a graphics pipeline distributor configured to distribute the geometry chunk to the graphics pipeline.

11. The system of claim 6, wherein the geometry chunk is represented as a display list.

12. The system of claim 6, wherein the geometry chunk is represented as a vertex array object.

13. The system of claim 6, wherein the geometry chunk is represented as buffered vertices.

* * * * *